United States Patent

Wheeler

[15] 3,689,773
[45] Sept. 5, 1972

[54] FLAME MONITOR SYSTEM AND METHOD USING MULTIPLE RADIATION SENSORS

[72] Inventor: Peter John Wheeler, Carshalton Beeches, England

[73] Assignee: Bailey Miters & Controls Limited, Surrey, England

[22] Filed: Feb. 1, 1971

[21] Appl. No.: 111,589

[52] U.S. Cl. ............................250/217 F, 340/228.2
[51] Int. Cl. ............................................G08b 21/00
[58] Field of Search .................250/217 F, 215, 210; 340/228.2, 228.1; 431/79, DIG. 43

[56] References Cited

UNITED STATES PATENTS

| | | | |
|---|---|---|---|
| 2,820,945 | 1/1958 | Marsden, Jr. | 340/228.2 |
| 2,306,073 | 12/1942 | Metcalf | 250/217 F X |
| 3,247,387 | 4/1966 | Doubek, Jr. et al. | 250/210 |
| 2,388,124 | 10/1945 | Crews | 250/217 F X |

Primary Examiner—Walter Stolwein
Attorney—Joseph M. Maguire

[57] ABSTRACT

A flame monitor method and system where one pair or more of radiation sensors respond to high frequency radiation fluctuations in regions of the same flame or different flames, with each sensor producing an electrical signal indicative of the flame condition. The electrical signals developed by the sensors are utilized by an associated electrical circuit which produces an output signal which is a function of the difference in signals of the individual sensors of each sensor pair or the sum of the outputs of the sensor pairs used. Filtering, amplifying, rectifying, and calibrating means are included in the circuit to provide an output signal capable of any or all of the functions of indicating, controlling the flame condition and actuating an alarm.

11 Claims, 6 Drawing Figures

PATENTED SEP 5 1972

INVENTOR.
PETER J. WHEELER
BY
Joseph L. Brzuszek
ATTORNEY

INVENTOR.
PETER J. WHEELER
BY
Joseph L. Bryuszek
ATTORNEY

3,689,773

FLAME MONITOR SYSTEM AND METHOD USING MULTIPLE RADIATION SENSORS

BACKGROUND OF THE INVENTION

1. Field of the Invention

The present invention relates generally to methods and systems for flame monitoring of a burner in a furnace and more specifically to an apparatus utilizing at least one pair of radiation sensors to monitor a flame exhibiting high frequency radiation fluctuations. Circuit means is connected to the sensors to produce an output signal that will be the sum of the outputs of each pair of sensors, where each pair of sensors produces an output signal that is the difference of individual signal outputs of the pair.

2. Description of the Prior Art

Flame monitoring of a burner has heretofore comprised the use of thermocouples, expansion tubes, and radiation sensors. Due to the extremely high flame temperatures in process boilers, monitoring of boiler flames in large furnaces has been done mainly with remotely located radiation sensors or sonic microphone pickups, which detect the frequency of the flame.

Although the radiation sensor circumvents the problem of placing a sensor in the region of high flame temperature, is has shortcomings such as the inability to differentiate between flame radiation and radiation from the heated boiler or furnace wall regions. Thus, the flame may be extinguished and the flame detector will fail to respond. The fuel supply to the burners will continue to be discharged onto the hot furnace walls. This time lag between loss of flame and shut down of the fuel supply can cause an explosion.

There are specialized radiation sensors which sense ultraviolet radiation and others which generate signals corresponding to the amplitude of the high frequency flicker of the flame monitored. Both types of sensors can distinguish between flame radiation and background radiation since both ultraviolet and flickering radiation find a source of excitation exclusively in the flame. The use of a flickering type radiation sensor produces an output signal that is continuously fluctuating. The fluctuation may be hard to distinguish, and the problem becomes one of accurate detection of this fluctuation.

This problem of detecting a small variation in sensor output is effectively solved by the applicant's invention in the following manner. Two sensors are positioned to converge and the radiation magnitude received by the individual sensors is similar. A circuit means subtracts the output signals of the individual sensors of the pair, the steady and slowly varying components of flame radiation from the flame are effectively canceled leaving the rapidly varying difference signal for flame detection. The high frequency flame flickering is due to random pulses or burst of radiation from very localized sources in the flame, and there will always be a residual, varying component from the dual sensor system as long as the flame is present.

SUMMARY OF THE INVENTION

A flame monitor method including the steps of simultaneously sensing radiation from two parts of a flame region exhibiting high frequency radiation and combining the radiation from these two parts so as to cancel identical radiation components and retain the non-identical components. The retained non-identical radiation components are modified to provide a control signal suitable for actuating flame monitor equipment.

One flame monitor system utilizing the above described method according to the invention comprises at least one pair of radiation sensors, to monitor a flame exhibiting high radiation fluctuations. The output of each sensor is connected so as to give an output signal from the pair consisting of only the varying difference component of the high frequency radiation sensed by the sensor pair.

Another flame monitor system, in accordance with the invention, is comprised of a pair or numerous pairs of radiation sensors and circuit means connected thereto with the circuit output of each pair of sensors comprising only the varying difference component of the signals from each sensor pair. The circuit has means for balancing the steady state outputs of the individual sensors of each pair so that a null output may be obtained when each sensor of the pair is subjected to identical non-flickering radiation. The circuit further has filtering, amplifying, and rectifying means to modify the output of the sensor pair or pairs to a form capable of providing alarm, indication, and control functions.

The sensors are enclosed within a housing either individually or in pairs with a lens or lenses located on the enclosure face sighting on the flame to focus the radiation to the appropriate sensor. The sensor elements are either photovoltaic or photo-resistive. Photovoltaic sensors are electrically series connected while photo-resistive sensors are electrically parallel connected in the associated circuit means.

Further in accordance with the invention flame monitoring systems using the above method include a plurality of radiation sensing pairs, with each pair sensing different regions of a flame. The output of the individual pairs is combined additively and modified to provide a control signal.

DESCRIPTION OF THE PREFERRED EMBODIMENTS

Figure 1:
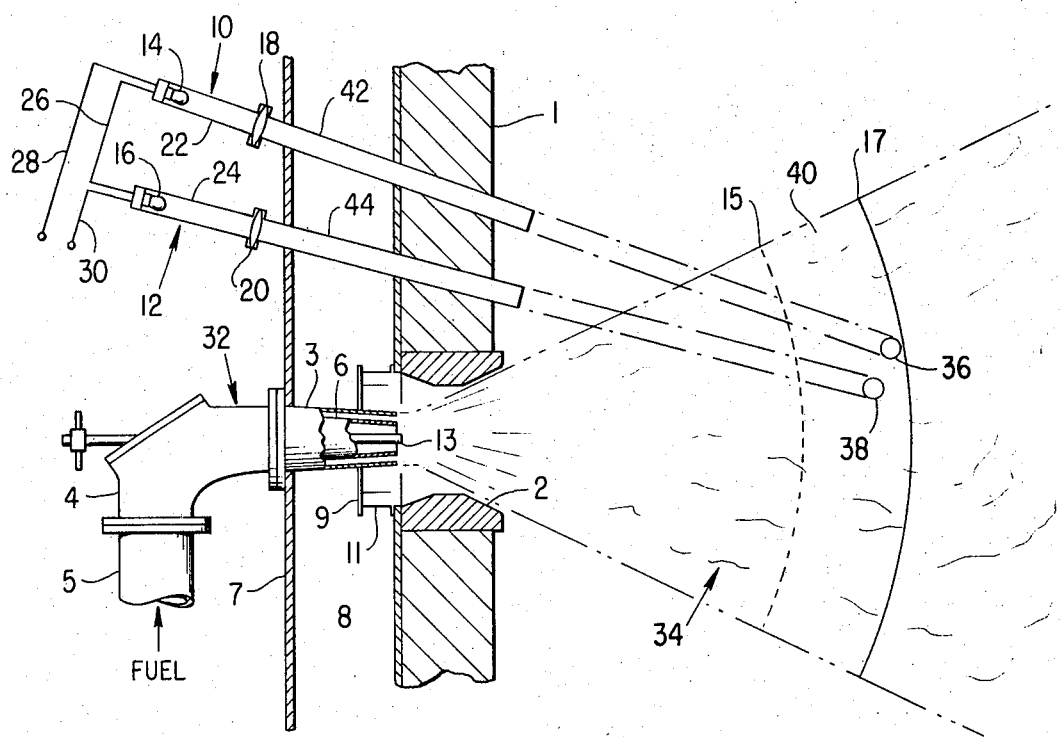
FIG. 1 is a sectional side elevation through a pulverized coal burner arranged in a furnace wall through which extend the sighting tubes of a flame monitoring system.

Referring now more particularly to the drawings wherein the showings are for purposes of illustrating the preferred embodiments of the invention and not for purposes of limiting same, FIG. 1 shows a pulverized coal burner 32 arranged at a vertical wall 1 of a furnace for discharging through a port 2, in the wall, a combustible mixture of pulverized coal and air.

The burner is of a kind with frusto-conical casing 3, coaxial with the port, which extends toward the furnace from a chamber 4. A feed pipe 5 connects with the chamber 4 so that a stream of a mixture of pulverized coal with air is supplied through the pipe 5. The mixture whirls about the axis of the casing 3 and is discharged from the open end thereof. Arranged coaxially with the casing 3 is an inner frusto-conical casing 6 which supplies a stream of additional air to the central region of the whirling mixture discharged from the casing 3.

The burner 32 is mounted in a wall 7 exterior to the furnace, and the wall 7 acts in conjunction with the furnace wall 1 to define a windbox or plenum chamber 8, common to a plurality of burners. The chamber 8 supplies the remainder of the air necessary for the efficient combustion of the pulverized coal. This added air flows to the port 2 through an air register 9, which comprises an annular casing extending around the frusto-conical casing 3 at the face of the wall 1. The peripheral wall 11 of the register 9 is formed as a plurality of inclined vanes or louvers (not shown) which causes the air flow from the plenum chamber to whirl around the burner axis. Means (not shown) are provided for adjusting simultaneously the inclination of all the said vanes in order to regulate the air flow as is well known to those in the art. In order to ignite the flame, an electrical igniter 13, positioned in the furnace end of the burner, is operated after projecting it towards the furnace from which it is withdrawn when the flame is started.

When the pulverized coal and the combustion air are discharged into the furnace, some coal particles ignite relatively early in the flame and some late. The fluent mass from the burner, initially consists of unignited coal particles and air and then of pulverized coal with an increasing portion of the ignited particles and the gaseous combustion products in air. The radial extent of the mass increases in diameter, so that it may be considered to have a definite boundary, with distance from the burner, for example, in approximately conical shape as indicated by the interrupted lines 15. Reference line 17 denotes the earlier zone downstream of which the fluent mass appears as an intensely radiant flame, the flame front upstream of the zone 17 is less brilliant because, the proportion of coal particles which have been ignited is smaller and the proportion of radiation obscured by unignited coal particles is larger.

Located above the burner 32 and extending through the wall 7, the plenum chamber 8 and the furnace wall 1 are two sighting tubes 42 and 44 of a flame monitoring system. The first sensor sighting tube 42 leads to a sensor assembly 10 comprising a housing 22 having a focusing lens 18 on the end facing the flame 34. Located internally to the housing 22 is a sensor 14 located at the end opposite the lens 18.

The second sensor sighting tube 44 leads to a sensor assembly 12 shown proximate to the first sensor assembly 10. The assembly 12 has a housing 24 with a focusing lens 20 on the end facing the flame 34 and a sensor 16 internal to the housing 24 at the end opposite the lens 20.

A common sensor leadwire 26 connects leads of the same polarity from sensor 14, 16, and second sensor leadwires 28, 30 are used to connect the sensor to an electrical circuit. This connection provides a series electrical connection of sensors 14, 16.

The flame 34 originating from the burner 32 has a flame front exhibiting high frequency flickering radiation 40 within which is located a first sighting area 36 and a second sighting area 38 as viewed by the first and second sensors 14, 16 respectively.

In operation the sensors 14, 16 produce an electrical output signal which is a function of the flame radiation. As the flame radiation flickers, so does the output signal. The sensors are connected series opposing in polarity to produce an output signal at the terminals of leadwires 28, 30 from which the steady state and slowly varying components have been cancelled by the circuit leaving only the varying difference components. If the flame 34 were extinguished, the sensors 14, 16 would immediately sense only a steady state residual radiation from the surroundings and produce a zero output difference signal indicating the lack of flame.

Figure 2:
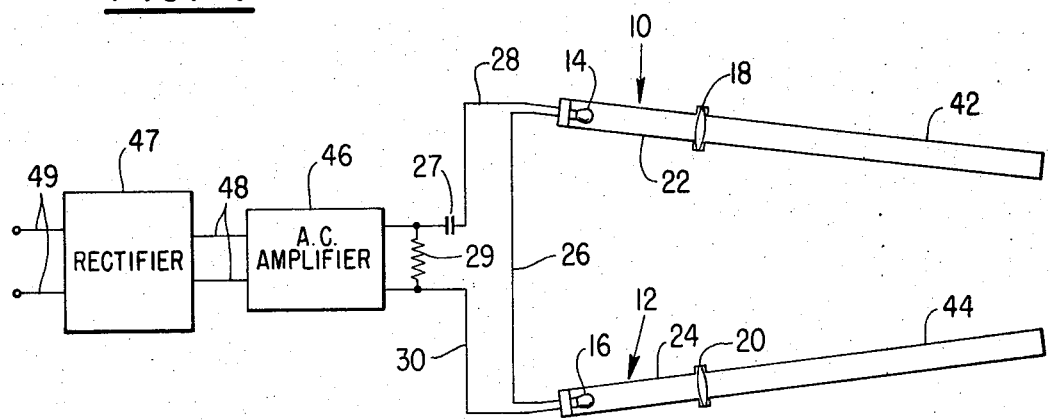
FIG. 2 is a plan view of a flame monitoring system showing the convergence of the sighting assembly.

Referring now to FIG. 2, there is schematically shown a flame monitoring system including electrical circuit means for producing an output signal which is a function of the difference between the signals from the first and second radiation sensing assemblies 10, 12. The sensor sighting tube 42 leads to a lens 18, and the second sensor sighting tube 44 leads to the lens 20. The sighting tubes 42, 44 isolate the sighting areas 36, 38 respectively and prevent any radiation from one sighting area from affecting any sensor except the one associated with it. Further the tube allows the placement of the sensor assembly in a location of cooler ambients removed from the heat of the flame 34.

The output of the dual sensor assemblies is connected to an A.C. amplifier 46 through an RC coupling consisting of a resistor 29 and a capacitor 27. By reason of this RC coupling, low frequency variations are attenuated so that the input to the amplifier 46 consists mainly of high frequency variations. The flame front 40 produces radiation with high frequency flicker. It is found that in spite of the connection of the cells in opposition, the amplifier 46 receives an oscillatory input. This is explainable by the fact that high frequency flicker in the radiation from the region 40 is due to random pulses or bursts of radiation from varying numerous, localized sources of radiation. Since the majority of the individual pulses occurring in either part of the flame region will, in view of their random timing, not be synchronous with any of the pulses occurring in the other part of the flame region and therefore their effect will appear in the input to the amplifier. The amplifier 46 provides a means of raising the output signal from the RC coupling consisting of this high frequency variation to a level capable of performing the desired indication, alarm, or control function at the amplifier output leads 48. The signal from leads 48 inputs into a rectifier 47 which is either a full wave or a half wave rectifier. The function of the rectifier 47 is to produce a steady D.C. output at the rectifier output leads 49.

Figure 3:
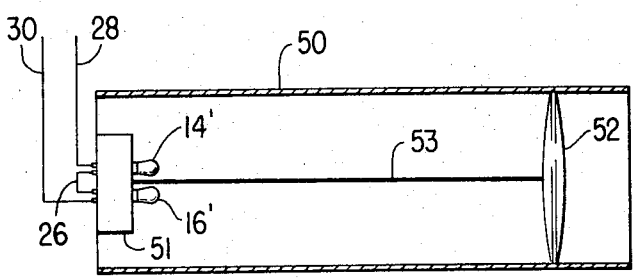
FIG. 3 is a sectional plan view of a common sighting head mounting a pair of sensors and a common lens.

Referring now to FIG. 3, a sensor pair housing 50 is shown having a lens 52 mounted near one end of the housing 50. First and second sensors 14', 16' are shown mounted internal to the housing 50 on a mounting block 51 located at the end of the housing 50 opposite the lens 52. A partition 53 separates the first sensor 14' from the second sensor 16'. Sensor leadwires are connected to the first and second sensors 14', 16'.

This housing arrangement may be used when the sensors are viewing closely adjacent flame sighting areas. It should be understood that with this housing arrangement, the partition 53 and the lens 52 are arranged so as to insure that sensor 14' receives radiation from a flame area which is not radiated to the sensor 16' and vice versa. The same effect may be had exclusively with lensing assemblies or with other partitioning configurations.

Figure 4:
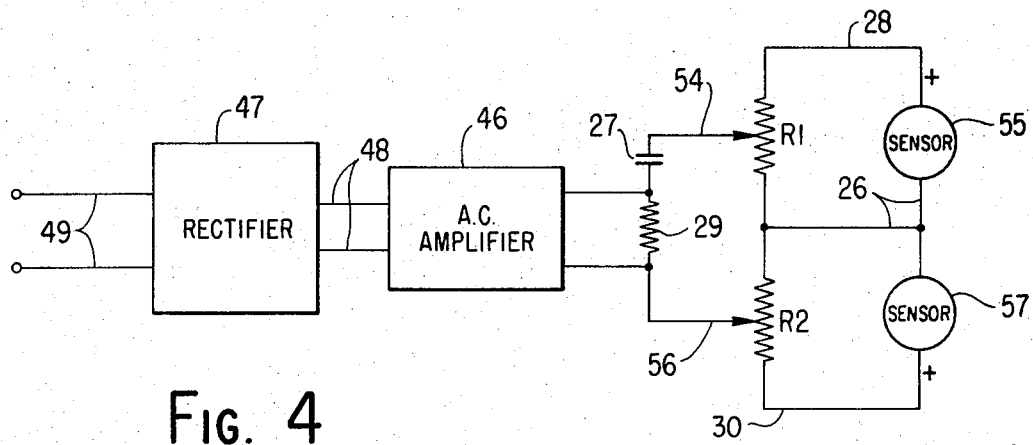
FIG. 4 is a circuit schematic of the invention showing a pair of photovoltaic sensors connected in series opposition.

Referring now to FIG. 4, a first photovoltaic sensor 55 is shown having its negative terminal connected to the negative terminal of a second photovoltaic sensor 57 through common leadwire 26. The positive terminal of the first sensor 55 is connected to one terminal of a potentiometer R1 whose other terminal joins the common leadwire 26 and a potentiometer R2. The positive terminal of the second sensor 57 is connected to the potentiometer R2. An RC coupling consisting of capacitor 27 and resistor 29 connects with the sensors through leadwires 54, 56 to provide the input to amplifier 46. The amplifier is connected to a rectifier 47 through leads 48. The rectifier has leads 49 which provide a steady D.C. output from this photovoltaic assembly as described previously in reference to FIG. 2.

The effect of this circuit arrangement is to place the first and second photovoltaic sensors 55, 57 in series opposition through potentiometers R1, R2 respectively. These same potentiometers are also used to calibrate the sensors so that steady and slowly varying components of flame radiation would be cancelled. Calibration is performed by subjecting the first and second sensors 55, 57 to identical non-flickering radiation. The first and second sensors 55, 57 then produce their respective voltages across potentiometers R1 and R2. The portion of the voltage across the potentiometer R1 between the common leadwire 26 and potentiometer R1 leadwire 54 is in series opposition with the portion of the voltage across the potentiometer R2 between the common leadwire 26 and potentiometer leadwire 56. Thus a zero input level to the amplifier 46 may be produced by adjusting one or both of the potentiometers until the opposing voltages are equal. In actual operation when the sensors are detecting flickering radiation, like components of the first and second sensor 55, 57 outputs will cancel leaving only the flickering radiation components of the flame. These flickering components are inputed to the amplifier 46 through the RC coupler which attenuates the slowly varying components. The amplifier 46 on raising the signal level of the high frequency radiation input, will input this elevated signal to the rectifier 47 which will, in turn, convert this elevated signal to a pure D.C. output at the rectifier 47 output leads 49.

Figure 4A:
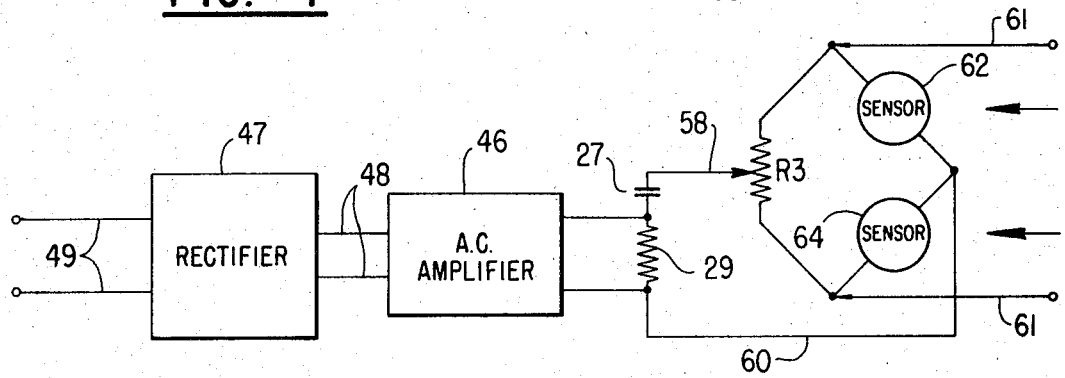
FIG. 4a is a circuit schematic of the invention showing a pair of photo-resistive sensors connected in parallel.

Referring now to FIG. 4a, a Wheatstone bridge sensor arrangement is shown using a first photo-resistive sensor 62 and a second photo-resistive sensor 64 located on separate branches of the bridge. A potentiometer R3 is connected in parallel with the sensors across opposite corners to complete the bridge. The bridge is powered through leads 61 with the bridge output connected to the amplifier 46 by leads 58 and 60 through the RC coupler consisting of capacitor 27 and resistor 29. The amplifier 46 in turn is connected to the rectifier 47. This circuit arrangement results in a pure D.C. output as explained previously in reference to FIG. 2.

In operation the bridge output is zero when the ratio of the resistances in the branches between the bridge power supply leads are equal. The bridge may thus be calibrated through potentiometer R3 by varying the splitting of resistance R3's portions into the two adjacent branches until the ratio of this resistance split is equal to the ratio of the resistance of the first and second photo-resistive sensors 62, 64. This is done with an identical source of non-flickering radiation applied to both the first and second sensors 62, 64. When the sensors are then subjected to non-identical flickering radiation, the bridge balance will be destroyed and an output signal from the bridge will be transmitted to the amplifier 46. The amplifier raises the signal to a level capable of providing control, alarm, or indication. The oscillatory, elevated amplifier signal is inputed to the rectifier 47 which converts this signal to a D.C. output at the rectifier leads 49.

Figure 5:
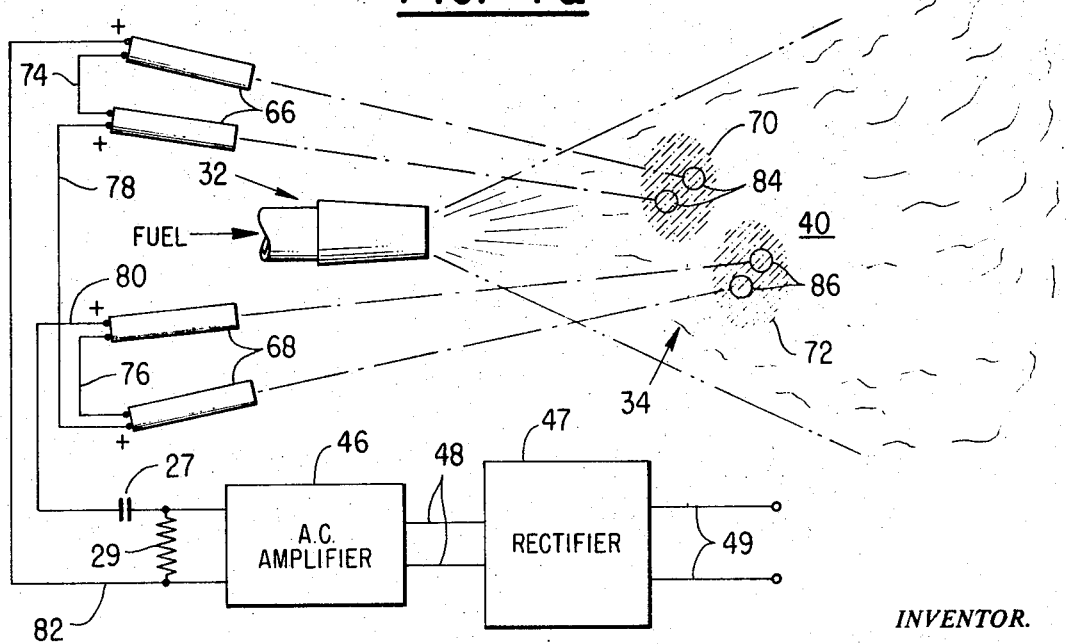
FIG. 5 is a schematic of a plurality of sensor pairs set to view a high frequency radiation zone of a flame and electrically interconnected so as to produce an output signal which is the sum of the signal difference of each pair.

Referring now to FIG. 5, an alternative arrangement is shown using two pairs of sensors, each individual pair the same as described in reference to FIG. 2. This same concept can be carried out to include the use of more than two pairs of sensors just as easily. A first sensor pair assembly 66 and a second sensor pair assembly 68 are shown sighting a first area 70 and a second area 72 respectively. Both the first and second viewing areas 70, 72 have individual sensor viewing areas 84, 86 respectively.

Both the first and second sensor pair assemblies 66, 68 have their individual sensors connected in opposition through a first common leadwire 74 and a second common leadwire 76. The two remaining leads from the first sensor pair assembly, input lead 82 and an output lead 78, connect the first sensor pair 66 in series with the second sensor pair 68. The amplifier input lead 80 is also connected to the second sensor pair assembly 68. A shunt resistor 29 is applied across the input to the amplifier 46 and with a capacitor 27 forms the RC coupler for low frequency attenuation. The amplifier is connected to the rectifier 47 which provides a steady D.C. output signal at the rectifier leads 49.

In operation this circuit provides for series opposition of the individual sensor outputs of both the first and second sensor pairs and series addition of the first and second sensor pair outputs. This combined signal is then inputed to the amplifier 46 through the RC coupler with the amplifier raising the high frequency signal to a level capable of indicating or controlling the flame 34 or sounding an alarm condition in case of flame failure. Because the signal is still oscillatory, however, it is inputed to the rectifier 47 which produces a steady D.C. output at the rectifier leads 49.

Certain modifications will be obvious to persons skilled in the art upon reading the specification. It is intended to include not only the matter as specified but also these obvious modifications.

What I claim as new and desire to secure by Letters Patent of the United States is:

1. A flame monitoring system comprising:
   first means, aligned to sense the radiation from a region of the flame exhibiting high frequency random flickering radiation components and other radiation components, for producing a first electrical signal indicative thereof;
   second means, aligned to sense radiation from another part of said region of the flame exhibiting high frequency random flickering radiation components and other radiation components, for producing a second electrical signal indicative thereof; and,
   electrical circuit means for combining said first and said second electrical signals to cancel the other radiation components of said signals and retain the random high frequency flickering radiation components of the signals proportional to the sensed radiation.

2. A flame monitoring system as set forth in claim 1 wherein said electrical circuit includes;
   filtering, amplifying, and rectifying means for modifying the output signal of said electrical circuit means to a form capable of controlling said flame.

3. A flame monitoring system as set forth in claim 2 wherein said first and second radiation sensing means are photovoltaic cells and are connected in series opposition in said electrical circuit.

4. A flame monitoring system as set forth in claim 2 where said first and second radiation sensing means are photoresistive cells and are connected in parallel on individual arms of a "Wheatstone" bridge in said electrical circuit means.

5. A flame monitoring system as set forth in claim 1, wherein said electrical circuit means includes
   means for balancing the outputs of said first and second radiation sensing means whereby the output signal from said electrical circuit is nulled upon application of identical non-flickering radiation to said first and second radiation sensing means.

6. A flame monitoring system as set forth in claim 5, including:
   means for enclosing said first and second radiation sensing means, said enclosing means including a lens and deflecting means for focusing radiation to said first and second radiation sensing means in a manner such that said first radiation sensing means only receives radiation from a part of said region of the flame not received by said second radiation sensing means and said second radiation sensing means only receives radiation from a part of said region of the flame not received by said first radiation sensing means.

7. A flame monitoring system as set forth in claim 6 wherein said means for enclosing includes an individual enclosure for each of said first and second radiation sensing means, each individual enclosure having a lens for focusing radiation to the respective radiation sensing means therewithin.

8. A flame monitoring system as set forth in claim 7 including:
   a sighting tube leading from the region of the flame exhibiting flickering radiation to said lens of said enclosing means.

9. A flame monitoring system comprising:
   first means, aligned to sense the radiation from a region of a flame exhibiting high frequency flickering radiation, for producing a first electrical signal indicative thereof;
   second means, aligned to sense radiation from another part of said region of said flame exhibiting high frequency flickering radiation, for producing a second electrical signal indicative thereof;
   electrical circuit means for producing an output signal which is a function of the difference between the signals from said first and second radiation sensing means;
   said electrical circuit further comprising filtering, amplifying, and rectifying means for modifying the output signal of said electrical circuit means to a form capable of controlling said flame; and,
   further including a plurality of pairs of radiation sensing means and each said pair sighting a different region of said flame exhibiting flickering radiation, each said pair connected to said electrical circuit so that the output of each said pair of radiation sensing means is a function of the difference of the individual radiation sensing means of said pair with the output signal of said electrical circuit being a function of the sum of the outputs of said plurality of pairs of radiation sensing means.

10. A flame monitoring system comprising:
    first means, aligned to sense the radiation from a region of a flame exhibiting high frequency flickering radiation, for producing a first electrical signal indicative thereof;
    second means, aligned to sense radiation from another part of said region of said flame exhibiting high frequency flickering radiation, for producing a second electrical signal indicative thereof;
    electrical circuit means for producing an output signal which is a function of the difference between the signals from said first and second radiation sensing means;
    said electrical circuit further comprising filtering, amplifying, and rectifying means for modifying the output signal of said electrical circuit means to a form capable of controlling said flame; and,
    further including a plurality of pairs of radiation sensing means and each of said pairs sighting a region of a different flame exhibiting high frequency flickering radiation, each said pair connected to said electrical circuit means so that the output signal of each said pair of radiation sensing means is a function of the difference of the individual radiation sensing means with the output signal of said electrical circuit means being a function of the sum of the outputs of said plurality of pairs of radiation sensing means.

11. A method for monitoring a flame characterized by random high frequency flickering radiation components and other radiation components comprising the steps of:

sensing the radiation from one part of a region of the flame exhibiting the random high frequency flickering radiation and generating a first electrical signal proportional to the flame radiation;

simultaneously sensing the radiation from a second part of said region exhibiting the random high frequency flickering radiation components and other radiation components and generating a second electrical signal proportional to said radiation; and, combining said first and said second electrical signals to cancel the other radiation components of said signals and retain the random high frequency flickering radiation components of the signals proportional to the sensed radiation.

* * * * *